United States Patent
Onda et al.

(10) Patent No.: US 6,886,630 B2
(45) Date of Patent: May 3, 2005

(54) COMPACT HEATING, VENTILATION AND AIR CONDITIONING SYSTEM FOR AUTOMOBILES

(75) Inventors: Masaharu Onda, Tochigi (JP); Yukio Ozeki, Tochigi (JP); Toshio Yajima, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 429 days.

(21) Appl. No.: 09/802,858

(22) Filed: Mar. 12, 2001

(65) Prior Publication Data

US 2001/0025707 A1 Oct. 4, 2001

(30) Foreign Application Priority Data

Apr. 4, 2000 (JP) ......................................... 2000-102646

(51) Int. Cl.[7] .............................. B60H 1/00; B60H 3/00; F25B 29/00
(52) U.S. Cl. ............................ 165/202; 165/42; 165/43; 62/244; 454/156; 454/160; 454/161
(58) Field of Search .................................. 454/160, 161, 454/156; 165/42, 43, 202; 62/244

(56) References Cited

U.S. PATENT DOCUMENTS

| | | | |
|---|---|---|---|
| 4,852,638 A | | 8/1989 | Hildebrand et al. |
| 5,836,380 A | * | 11/1998 | Takesita et al. ............... 165/43 |
| 6,347,988 B1 | | 2/2002 | Kurokawa et al. |
| 6,382,305 B1 | | 5/2002 | Sano |
| 6,431,257 B1 | | 8/2002 | Sano et al. |
| 6,450,246 B1 | | 9/2002 | Kurokawa et al. |
| 6,478,083 B1 | | 11/2002 | Nanba et al. |
| 6,609,563 B1 | | 8/2003 | Tsurushima et al. |

| | | |
|---|---|---|
| 2001/0017204 A1 | 8/2001 | Shirota et al. |

FOREIGN PATENT DOCUMENTS

| | | |
|---|---|---|
| DE | 195 34 738 A1 | 3/1996 |
| DE | 197 41 862 A1 | 3/1999 |
| EP | 0 788 907 A2 | 8/1997 |
| FR | 2 742 383 A1 | 6/1997 |
| JP | 8-282245 | * 10/1996 |
| JP | 9-123748 | * 5/1997 |
| JP | 9-309319 | * 12/1997 |
| JP | 10-58939 | * 3/1998 |
| JP | 10-147130 | * 6/1998 |
| JP | 10-244820 | * 9/1998 |
| JP | 10-244821 | * 9/1998 |
| JP | 10-297248 | * 11/1998 |
| JP | 10-297250 | * 11/1998 |
| JP | 11-198642 | * 7/1999 |
| JP | 11-321279 | * 11/1999 |

* cited by examiner

Primary Examiner—John K. Ford
(74) Attorney, Agent, or Firm—Foley & Lardner LLP

(57) ABSTRACT

A heating, ventilation and air conditioning system including a casing with a vent outlet, a blower chamber within the casing, a wall cooperating with the casing to form a descending air passage permitting a downward flow of air discharged from the blower chamber and an ascending air passage permitting an upward flow of air passing through the descending air passage toward the vent outlet. A heating heat-exchanger is substantially horizontally disposed within the ascending air passage and arranged adjacent to a recessed portion of the wall and at least partially overlapping in the vertical direction with a cooling heat-exchanger disposed between the blower chamber and the heating heat-exchanger. A bypass air passage bypassing the heating heat-exchanger is substantially linearly aligned with the vent outlet via the ascending air passage. A foot vent passage is disposed above the heating heat-exchanger and between the blower chamber and the ascending air passage.

17 Claims, 9 Drawing Sheets

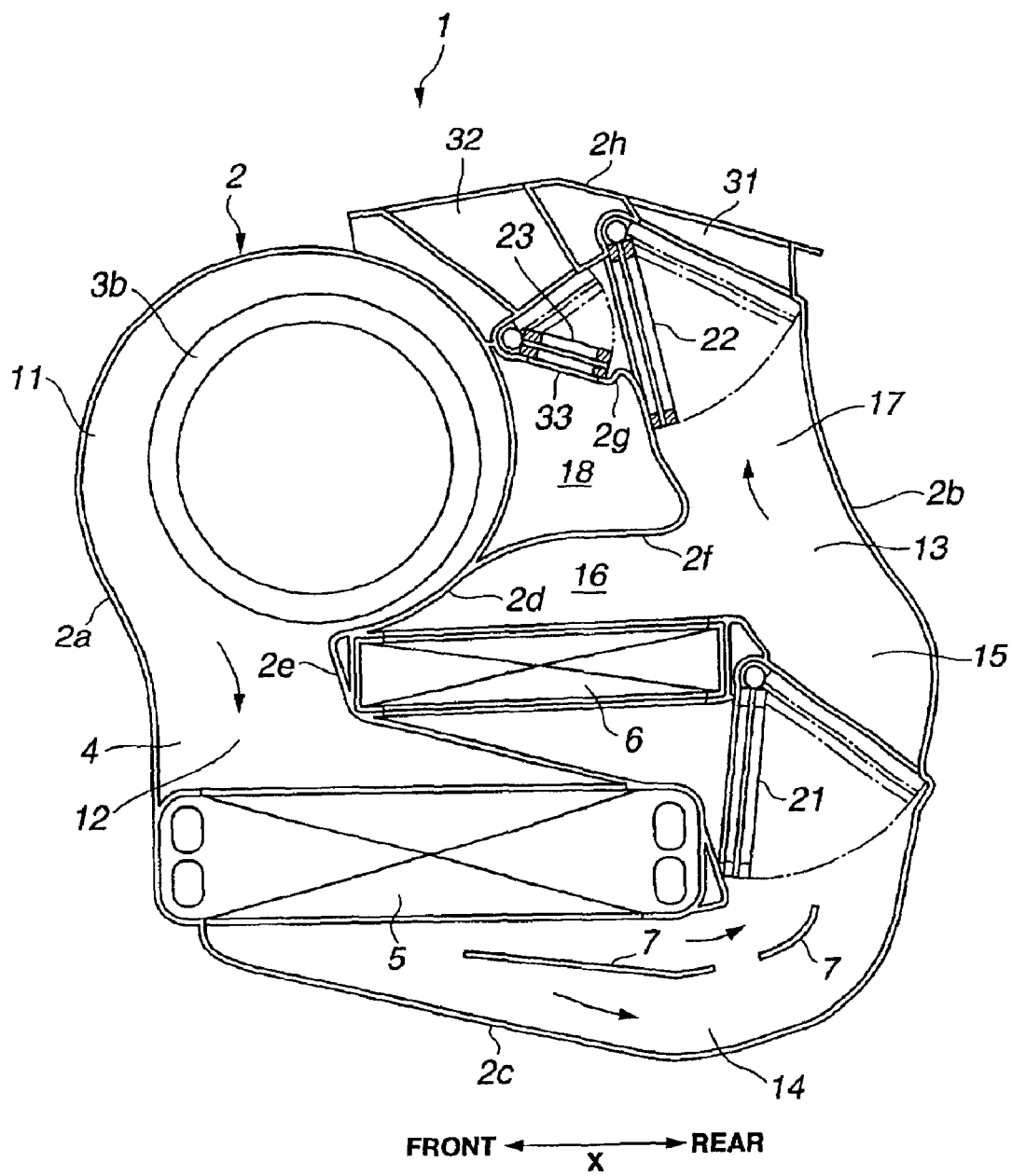

FRONT ←— X —→ REAR

COMPACT HEATING, VENTILATION AND AIR CONDITIONING SYSTEM FOR AUTOMOBILES

BACKGROUND OF THE INVENTION

This invention relates to an automobile heating, ventilation and air conditioning (HVAC) system.

There has been proposed an automobile heating, ventilation and air conditioning system (HVAC system) including a casing, a scroll chamber defined within the casing and having a blower fan, and an air passage defined within the casing and permitting air discharged from the blower fan to flow therethrough. The air passage includes a descending air passage through which the air from the blower fan flows downward, an ascending air passage through which the air fed from the descending air passage flows upward, and a communication air passage communicating the descending air passage with the ascending air passage. A heat exchanger for cooling the air from the blower fan, which is hereinafter referred to as a cooling heat-exchanger, is substantially horizontally disposed within the descending air passage. Another heat exchanger for heating the air passing through the cooling heat-exchanger, which is hereinafter referred to as a heating heat-exchanger, is disposed within the ascending air passage. A bypass air passage bypassing the heating heat-exchanger is disposed within the ascending air passage. The heating heat-exchanger is juxtaposed to the cooling heat-exchanger within the casing. Disposed within the communication air passage is an air-mix door for controlling a proportion of the air entering into the heating heat-exchanger, to the air entering into the bypass air passage. The casing has an inner wall defining the scroll chamber and the descending air passage. The inner wall is formed with a recessed portion disposed between the scroll chamber and the descending air passage. The recessed portion is recessed toward the descending air passage and exposed to the ascending air passage. A foot vent passage for permitting the air flow in a foot vent mode is disposed on the ascending air passage side of the recessed portion. A vent outlet and a defroster outlet, which are adapted to be open in vent and defroster modes, respectively, are disposed on an upper part of the ascending air passage. Such the HVAC system is disclosed in Japanese Patent Provisional Publication No. 8-282245.

In general, the automobile compartment tends to be exposed to high temperature in summer, for instance, during parking under sun heating. Therefore, it is required to increase an amount of cool air in full cool state in the vent mode, in which the whole amount of cool air passing through the cooling heat-exchanger flows through the bypass air passage. If a high-power motor of the blower fan is used for fulfilling the requirement, the HVAC system will be enlarged in size and the noise resulting from the increased amount of air discharged from the blower fan will become large. There is a demand for improving reduction of the noise in full cool state in the vent mode.

However, since in the above-described conventional technique, the bypass air passage of the ascending air passage is greatly curved to bypass the heating heat-exchanger, the bypass air passage is not linearly aligned with the vent outlet. This will cause high ventilation resistance in the bypass air passage in full cool state in the vent mode and, therefore, will prevent a smooth flow of the cool air passing through the bypass air passage, resulting in reduction of the amount of cool air and increase in the noise in the vent mode. If the bypass air passage and the vent outlet are linearly aligned with each other so as to permit a generally straight flow of the cool air in order to eliminate the reduction of the cool air amount and the increase in the noise, the upper part of the ascending air passage, which is disposed upward, namely downstream of the heating heat-exchanger and the bypass air passage juxtaposed to the heating heat-exchanger, will be required to largely increase in width. This will disturb the dimensional reduction of the casing and then that of the HVAC system as a whole.

SUMMARY OF THE INVENTION

It is an object of the present invention to provide an automobile heating, ventilation and air conditioning (HVAC) system capable of increasing an amount of air in full cool state in the vent mode and reducing noise in the same state.

According to one aspect of the present invention, there is provided a heating, ventilation and air conditioning system for use in an automobile, comprising:

a casing having a vent outlet;

a blower chamber accommodating a blower fan discharging air, said blower chamber being disposed within the casing;

a descending air passage communicated with the blower chamber to permit the air from the blower fan to flow downwardly therethrough;

an inner wall cooperating with the casing to form the blower chamber and the descending air passage, said inner wall being formed with a recessed portion located near a boundary between the blower chamber and descending air passage;

a cooling heat-exchanger adapted to cool the air passing therethrough to produce cool air;

an ascending air passage communicated with the descending air passage and the vent outlet to permit the air passing through the descending air passage to flow upwardly therethrough into the vent outlet;

a heating heat-exchanger disposed within the ascending air passage and adapted to heat the air passing therethrough to produce warm air, said cooling heat-exchanger being disposed between the blower chamber and the heating heat-exchanger;

a bypass air passage juxtaposed to the heating heat-exchanger and communicated with the ascending air passage to permit the cool air from the cooling heat-exchanger to bypass the heating heat-exchanger and flow into the ascending air passage;

an air-mix door adapted to control a proportion of the warm air passing through the heating heat-exchanger and the cool air passing through the bypass air passage; and a foot vent passage communicated with the ascending air passage;

wherein the heating heat-exchanger is arranged substantially horizontally at the recessed portion of the inner wall and has one end portion adjacent to the recessed portion and an opposite end portion adjacent to the bypass air passage, wherein the bypass air passage and the vent outlet are substantially linearly aligned with each other via the ascending air passage, and wherein the foot vent passage is arranged above the heating heat-exchanger and between the blower chamber and the ascending air passage.

According to a further aspect of the present invention, there is provided a heating, ventilation and air conditioning system for use in an automobile, comprising:

a casing having a vent outlet;

a blower chamber accommodating a blower fan discharging air, said blower chamber being disposed within the casing;

a first air passage substantially vertically extending within the casing and communicated with the blower chamber to permit the air from the blower fan to flow downwardly therethrough;

a second air passage substantially vertically extending within the casing and communicated with the first air passage to permit the air passing through the first air passage to flow upwardly therethrough into the vent outlet;

a cooling heat-exchanger adapted to cool the air passing therethrough to produce cool air;

a heating heat-exchanger arranged substantially horizontally within the second air passage and in an at least partially overlapping relation to the cooling heat-exchanger in a vertical direction, said heating heat-exchanger being adapted to heat the air passing therethrough to produce warm air, said cooling heat-exchanger being disposed between the blower chamber and the heating heat-exchanger;

a wall cooperating with the casing to define the blower chamber, the first air passage, the second air passage and a recessed portion located near a boundary between the blower chamber and the first air passage and adjacent to the heating heat-exchanger;

a bypass air passage arranged in substantially linear alignment with the vent outlet via the second air passage in the vertical direction, said bypass air passage being juxtaposed to the heating heat-exchanger in a fore and aft direction of the automobile and communicated with the second air passage to permit the cool air from the cooling heat-exchanger to bypass the heating heat-exchanger and flow into the second air passage; and a foot vent passage arranged above the heating heat-exchanger and between the blower chamber and the second air passage, said foot vent passage being communicated with the second air passage.

BRIEF DESCRIPTION OF THE DRAWINGS

FIG. 2A is a schematic section of the system, taken along the direction X of FIG. 1;

DETAILED DESCRIPTION OF THE INVENTION

Figure 1:
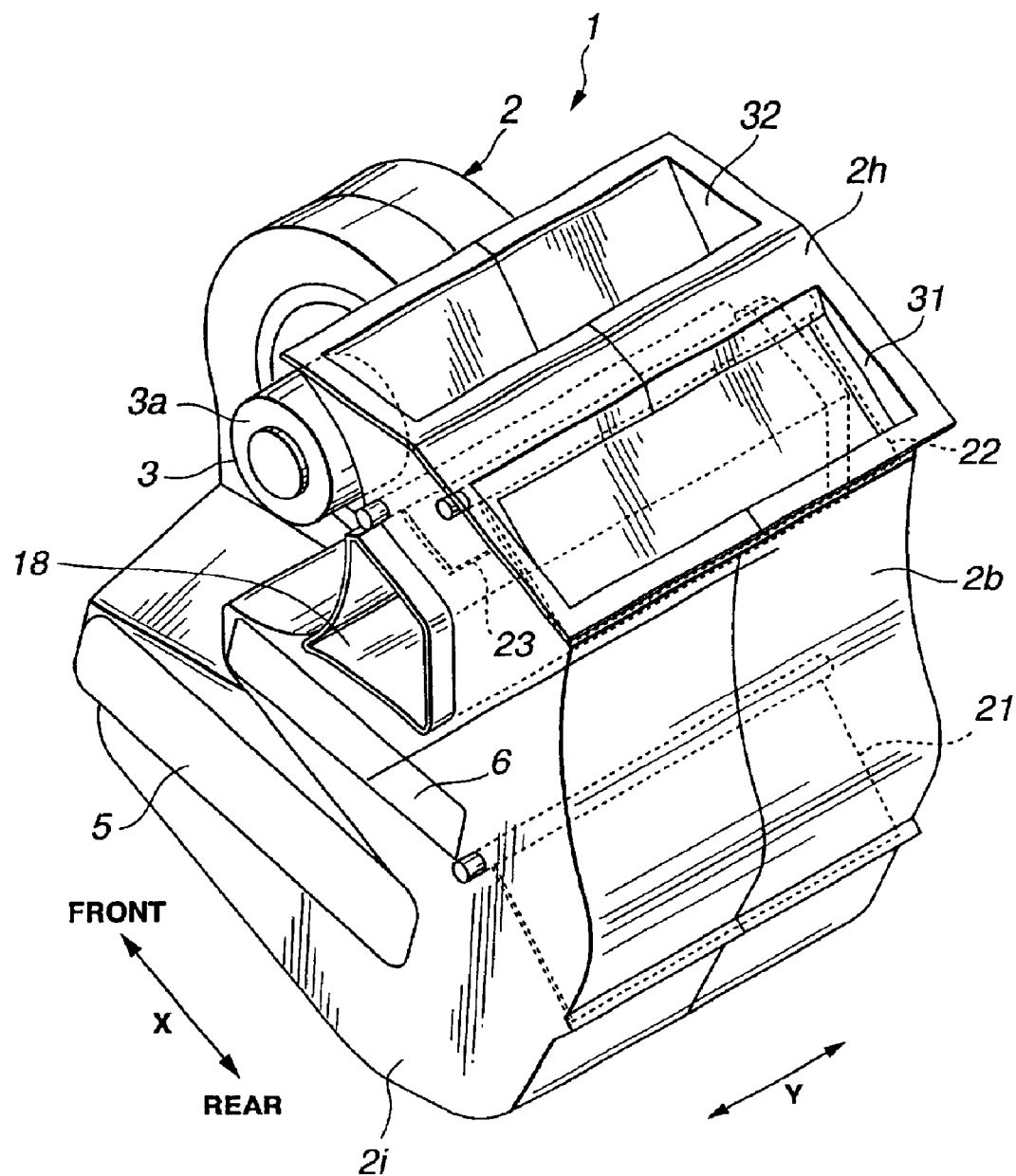
FIG. 1 is a perspective view of an automobile HVAC system of a first embodiment, according to the present invention.

Referring now to FIGS. 1 and 2A, an automobile heating, ventilation and air conditioning (HVAC) system of the first embodiment, according to the present invention, is generally indicated at 1. The HVAC system is installed in a space within a passenger compartment which is located behind an instrument panel.

As illustrated in FIG. 1, the HVAC system 1 includes a casing 2 and a blower unit 3 accommodated in the casing 2. The blower unit 3 includes a blower motor 3a shown in FIG. 1 and a centrifugal multiblade fan 3b shown in FIG. 2, driven by the motor 3a to discharge air. In this embodiment, a so-called scirocco fan is used as the centrifugal multiblade fan 3b.

As illustrated in FIG. 2A, the casing 2 includes a front wall 2a located on the engine room side and a rear wall 2b located on the passenger compartment side, which are separably joined together using a suitable connecting member such as tightening screws. A blower chamber 11 accommodating the centrifugal multiblade fan 3b is disposed within an upper-most part of the casing 2 which is defined by the front wall 2a. Disposed within the casing 2 is an air passage 4 that is communicated with the blower chamber 11 to permit the air discharged by the multiblade fan 3b to pass therethrough. The air passage 4 includes a descending air passage 12 permitting the air discharged from the multiblade fan 3b to flow downward along the front wall 2a, an ascending air passage 13 permitting the air coming from the descending air passage 12 to flow upward along the rear wall 2b, and a communication air passage 14 communicating the descending air passage 12 with the ascending air passage 13. The communication air passage 14 is formed along a bottom wall 2c disposed between the front wall 2a and the rear wall 2b.

A heat exchanger 5 for cooling the air passing therethrough to produce cool air, which is hereinafter referred to as the cooling heat-exchanger, is disposed within the descending air passage 12. The cooling heat-exchanger 5 is located near the bottom wall 2c at the lower part of the casing 2, so that the cool air passing through the cooling heat-exchanger 5 enters into the communication air passage 14 and flows along the bottom wall 2c. Guide plates 7 are disposed within the communication air passage 14, acting for smoothly guiding the air passing through the cooling heat-exchanger 5 to the ascending air passage 13. The bottom wall 2c extends, from each periphery of the front and rear walls 2a and 2b slantly downwardly to a central portion thereof that forms a water-collecting part for collecting condensed water produced by the cooling heat-exchanger 5 is collected. The condensed water is discharged through a drain, not shown, formed in the central portion of the bottom wall 2c.

Figure 2B:
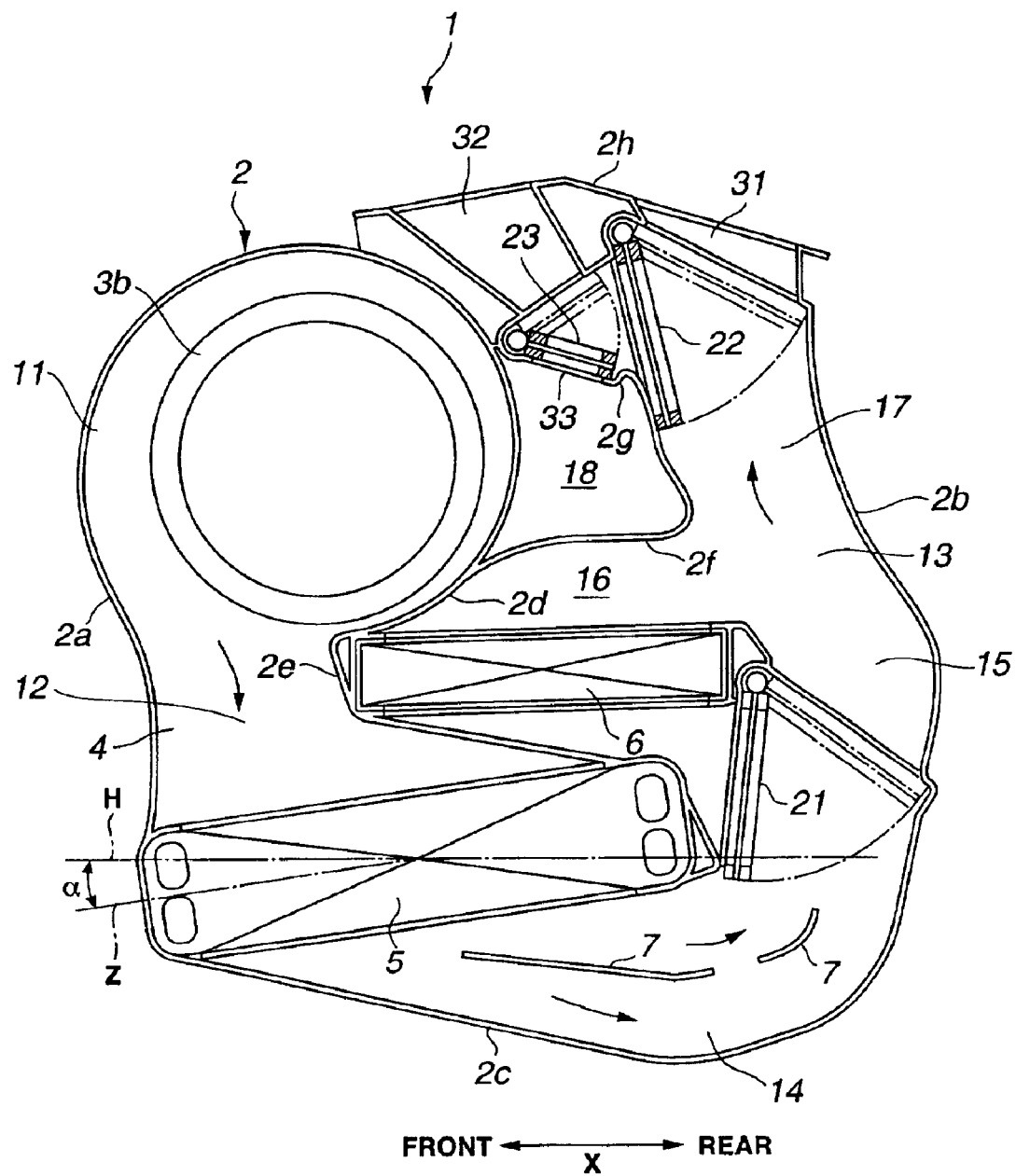
FIG. 2B is an explanatory diagram for illustrating arrangement of a heat exchanger for cooling.

The cooling heat-exchanger 5 is arranged in an inclined state in a fore and aft direction X of the automobile in such a manner that a front end thereof adjacent to the front wall 2a of the casing 2 is positioned at a height or level lower than a rear end thereof opposed to the rear wall 2b of the casing 2. More specifically, when viewed in section taken along the direction X as shown in FIG. 2B, the cooling heat-exchanger 5 is inclined by a predetermined angle $\alpha$ relative to a horizontal plane H. Reference character Z denotes a hypothetical plane of the cooling heat-exchanger 5 which is inclined by the predetermined angle $\alpha$ for guiding the condensed water by gravity. In this embodiment, the water-guiding plane is formed by upper and lower surfaces of the cooling heat-exchanger 5. The predetermined angle $\alpha$ is preferably within a range of approximately 10–30 degrees. If the predetermined angle $\alpha$ is smaller than 10 degrees, it will become difficult to properly discharge the condensed water. If the predetermined angle $\alpha$ is larger than 30 degrees, a height or vertical dimension of the casing 2 will increase, resulting in enlargement of the casing 2.

Figure 5:
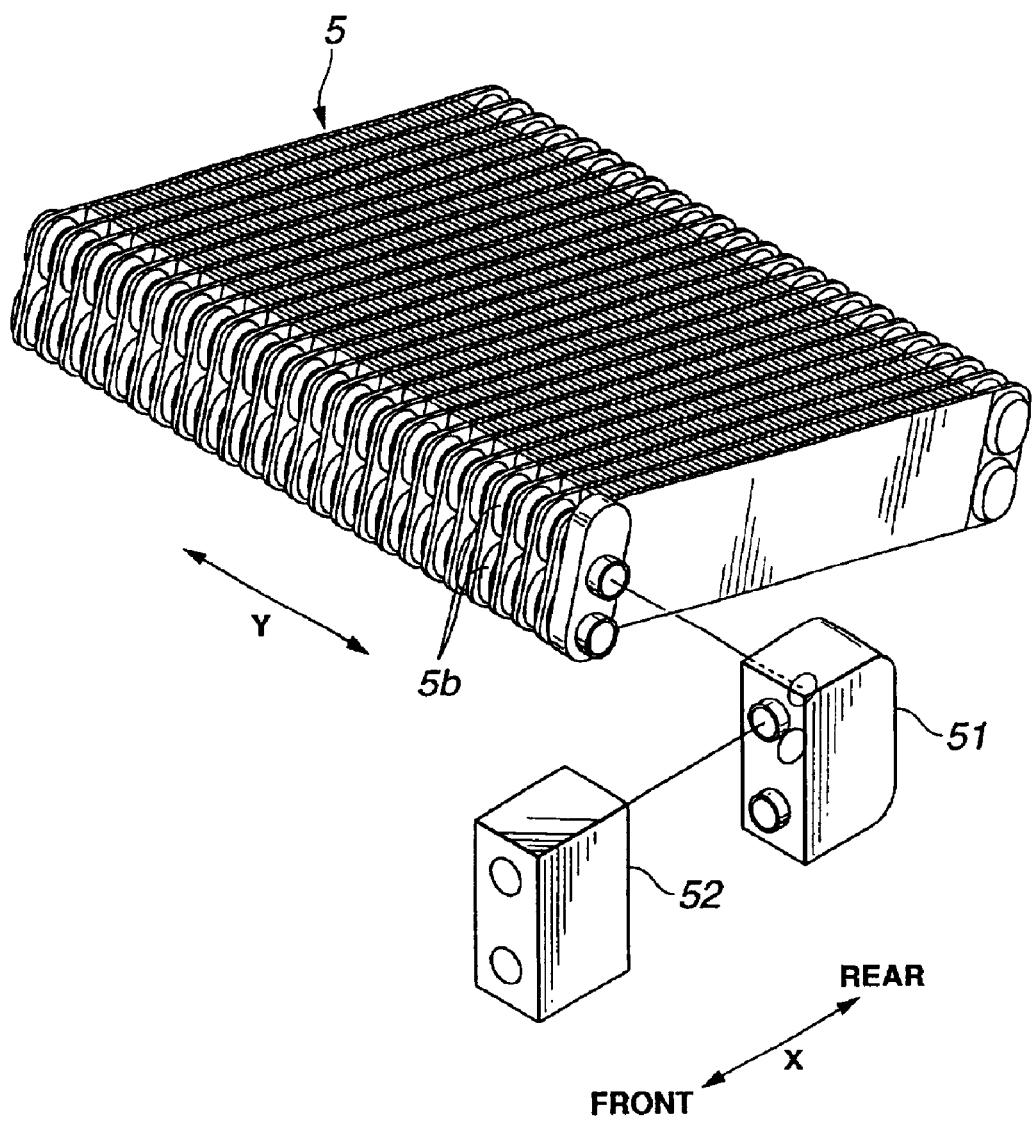
FIG. 5 is a perspective view of a heat exchanger for cooling, shown in FIGS. 3 and 4.

The cooling heat-exchanger 5 is illustrated in FIG. 5. However, the cooling heat-exchanger 5 is inclined in the illustrated direction reverse to that shown in FIGS. 2A and 2B, namely, the rear end of the cooling heat-exchanger 5 is located at a height lower than the front end. The cooling heat-exchanger 5 includes header pipes 5b extending in a lateral or width direction Y of the automobile which extends perpendicular to the direction X. An expansion valve 52 connected with a refrigerant piping, not shown, is connected with the header pipes 5b via a connecting block 51. Refrigerant passing through the refrigerant piping flows into the header pipes 5b through the expansion valve 52 and the connecting block 51.

Referring back to FIG. 2A, a heat exchanger 6 for heating the air passing therethrough to produce warm air, which is hereinafter referred to as the heating heat-exchanger, is disposed within the ascending air passage 13. The heating heat-exchanger 6 is arranged substantially parallel to the cooling heat-exchanger 5 and in an at least partially overlapping relation thereto in the vertical direction. The heating heat-exchanger 6 is arranged substantially horizontally at a recessed portion 2e of an inner wall 2d extending within the casing 2.

The inner wall 2d is disposed between the front wall 2a and the rear wall 2b, cooperating with the front wall 2a to define the blower chamber 11 and the descending air passage 12. The inner wall 2d is bent to project toward the descending air passage 12 in the forward direction of the automobile so as to form the recessed portion 2e. The recessed portion 2e is located near a boundary between the blower chamber 11 and the descending air passage 12. The heating heat-exchanger 6 has a front end portion disposed adjacent to the recessed portion 2e and a rear end portion disposed adjacent to a bypass air passage 15 explained later. The inner wall 2d also forms an inlet portion of a volute air passage within the blower chamber 11. The volute air passage gradually increases in sectional area toward an outlet thereof. At the inlet portion, the volute air passage has a smallest sectional area and a smallest radial distance between the multiblade fan 3b and the recessed portion 2e of the inner wall 2d opposed to the multiblade fan 3b.

The bypass air passage 15 is disposed between the rear wall 2b of the casing 2 and the rear end portion of the heating heat-exchanger 6. The bypass air passage 15 is thus juxtaposed to the heating heat-exchanger 6 in the fore and aft direction X of the automobile. The bypass air passage 15 is communicated with the ascending air passage 13 to permit the cool air cooled by the cooling heat-exchanger 5 to bypass the heating heat-exchanger 6 and flow into the ascending air passage 13.

An air-mix door 21 is disposed within the bypass passage 15. The air-mix door 21 is pivotally moveable between a cool air position and a warm air position to control a proportion of the warm air passing through the heating heat-exchanger 6 and the cool air passing through the bypass air passage 15. At the cool air position as shown by the solid line in FIG. 2A, the air-mix door 21 allows the fluid communication between the cooling heat-exchanger 5 and the bypass air passage 15 and blocks the fluid communication between the cooling heat-exchanger 5 and the heating heat-exchanger 6. The cool air is thus introduced into the bypass air passage 15 and flows into the ascending air passage 13. At the warm air position as shown by the phantom line in FIG. 2A, the air-mix door 21 allows the fluid communication between the cooling heat-exchanger 5 and the heating heat-exchanger 6 and blocks the fluid communication between the cooling heat-exchanger 5 and the bypass air passage 15. The cool air is thus introduced into the heating heat-exchanger 6 and heated thereby.

A warm air passage 16 is disposed downstream of the heating heat-exchanger 6 and communicated with the ascending air passage 13. The warm air passage 16 guides the warm air heated by the heating heat-exchanger 6 toward the bypass air passage 15 side of the ascending air passage 13. The warm air passage 16 is formed by the inner wall 2d and a partition wall 2f described later.

A foot vent passage 18 is arranged above the heating heat-exchanger 6 and between the blower chamber 11 and the ascending air passage 13 in the fore and aft direction X of the automobile. The foot vent passage 18 extends in the width direction Y of the automobile to be open into opposed side walls 2i of the casing 2, only one of which is shown in FIG. 1. The foot vent passage 18 is communicated with the ascending air passage 13 to permit an air mixture of the cool air passing through the bypass air passage 15 and the warm air passing through the warm air passage 16, to flow thereinto via an air-mix chamber 17. The air-mix chamber 17 is disposed at a downstream portion of the ascending air passage 13, in which the cool air and the warm air are merged and mixed with each other to form the air mixture.

The partition wall 2f extends within the casing 2 and cooperates with the inner wall 2d to define the warm air passage 16 and the foot vent passage 18 and with the rear wall 2b of the casing 2 to define the ascending air passage 13. The partition wall 2f is connected with the inner wall 2d downstream of the heating heat-exchanger 6 and extends between the blower chamber 11 and the heating heat-exchanger 6 along the periphery of the blower chamber 11. The partition wall 2f thus separates the foot vent passage 18 from the ascending air passage 13 and the warm air passage 16.

The casing 2 includes a top wall 2h having a vent outlet 31 on the rear wall 2b side and a defroster outlet 32 on the front wall 2a side. The vent outlet 31 is communicated with the bypass air passage 15 through the ascending air passage 13. The vent outlet 31 and the bypass air passage 15 are substantially linearly aligned with each other via the ascending air passage 13 in the vertical direction. A foot communication opening 33 is formed in an uppermost portion 2g of the partition wall 2f which is opposed to the defroster outlet 32. The foot vent passage 18 and the ascending air passage 13 are communicated with each other through the foot communication opening 33.

A vent door 22 is moveably disposed at the vent outlet 31 so as to open and close the vent outlet 31. The vent door 22 is pivotally moveable between an open position in which a fluid communication between the ascending air passage 13 and the vent outlet 31 is allowed and a fluid communication between the ascending air passage 13 and the defroster outlet 32 and the foot communication opening 33 is prevented, and a closed position in which the fluid communication between the ascending air passage 13 and the vent outlet 31 is prevented and the fluid communication between the ascending air passage 13 and the defroster outlet 32 and the foot communication opening 33 is allowed. The vent door 22 is operatively controlled so as to take the open position in a vent mode of the HVAC system 1 and an intermediate or half-open position between the open and closed positions in a bi-level mode thereof.

A mode door 23 is moveably disposed between the defroster outlet 32 and the foot communication opening 33.

The mode door 23 is pivotally moveable between a defroster open position in which the defroster outlet 32 is open and the foot communication opening 33 is closed, and a foot open position in which the defroster outlet 32 is closed and the foot communication opening 33 is open. The mode door 23 is operatively controlled so as to take the defroster open position in a defroster mode of the HVAC system 1, the foot open position in a foot vent mode and the bi-level mode thereof, and a middle position between the defroster open position and the foot open position in a defroster-foot vent mode thereof. The mode door 23 thus acts as a foot door for opening the foot communication opening 33 in the foot vent mode and the bi-level mode.

As explained above, with the substantially linear alignment of the vent outlet 31 and the bypass air passage 15 via the ascending air passage 13, the whole amount of cool air passing through the cooling heat-exchanger 5 can flow through the bypass passage 15 with less ventilation resistance than that in the conventional HVAC system in the full cool state. The HVAC system 1 of the invention can increase an amount of cool air and reduce the generation of noise in the full cool state in the vent mode.

Further, the arrangement of the heating heat-exchanger 6 at the recessed portion 2e of the inner wall 2d of the casing 2 can contribute to reduction of the dimension of the casing 2 in the fore and aft direction X of the automobile. Furthermore, the arrangement of the foot vent passage 18 above the heating heat-exchanger 6 and between the blower chamber 11 and the ascending air passage 13 can serve for reducing the width of the ascending air passage 13 located upward the heating heat-exchanger 6, namely, immediately downstream of the heating heat-exchanger 6, and assuring an adequate section of the bypass air passage 15, to reduce the size of the casing 2. The arrangement also can contribute to the linear alignment of the vent outlet 31 and the bypass air passage 15 via the ascending air passage 13. Therefore, the HVAC system 1 of the invention can achieve not only the compact casing 2 but also the increase in air amount and the suppression of noise in the full cool state in the vent mode.

In addition, with the arrangement of the cooling heat-exchanger 5 inclined toward the bottom of the casing 2, the condensed water can be allowed to flow along the water-guiding surface of the inclined cooling heat-exchanger 5, whereby the HVAC system 1 can be improved in the condensed water drain property. The arrangement of the inclined cooling heat-exchanger 5 also can serve for restraining the height or vertical dimension of the casing 2.

Further, the arrangement of the heating heat-exchanger 6 disposed substantially horizontally and substantially parallel to the cooling heat-exchanger 5 can contribute to the reduction of the height of casing 2. This can facilitate installation of the HVAC system 1 into a compact automobile having a relatively small interior space, namely, a relatively small height for accommodating the HVAC system.

Further, in the bi-level mode, the air mixture is formed in the air-mix chamber 17 by admixing the cool air passing through the bypass air passage 15 with the warm air passing through the heating heat-exchanger 6. The air mixture contains a relatively low temperature air flowing along the rear wall 2b of the casing 2 and a relatively high temperature air flowing along the partition wall 2f thereof. The relatively low temperature air flows outside the casing 2 through the vent outlet 31. The relatively high temperature air flows into the foot vent passage 18 through the foot communication opening 33. Thus, in the bi-level mode, the relatively low temperature air is directed toward a torso or upper body part of the passenger and the relatively high temperature air is directed toward feet of the passenger. As a result, the air flow directed toward the passenger can be suitably tempered and conditioned in the bi-level mode so as to cool the head of the passenger and warm the feet thereof.

Furthermore, since the foot communication opening 33 is disposed at the uppermost portion 2g of the partition wall 2f, the air passage that extends through the air-mix chamber 17 and terminates at the foot communication opening 33, can have a relatively large length even if the casing 2 has a relatively small height. This can assure good mixing property of the air mixture of the cool air and the warm air which enter into the foot vent passage 18 in the bi-level mode. Accordingly, the good mixing property of the air mixture entering into the foot vent passage 18 in the bi-level mode can be achieved as well as the compact casing 2.

Figure 3:
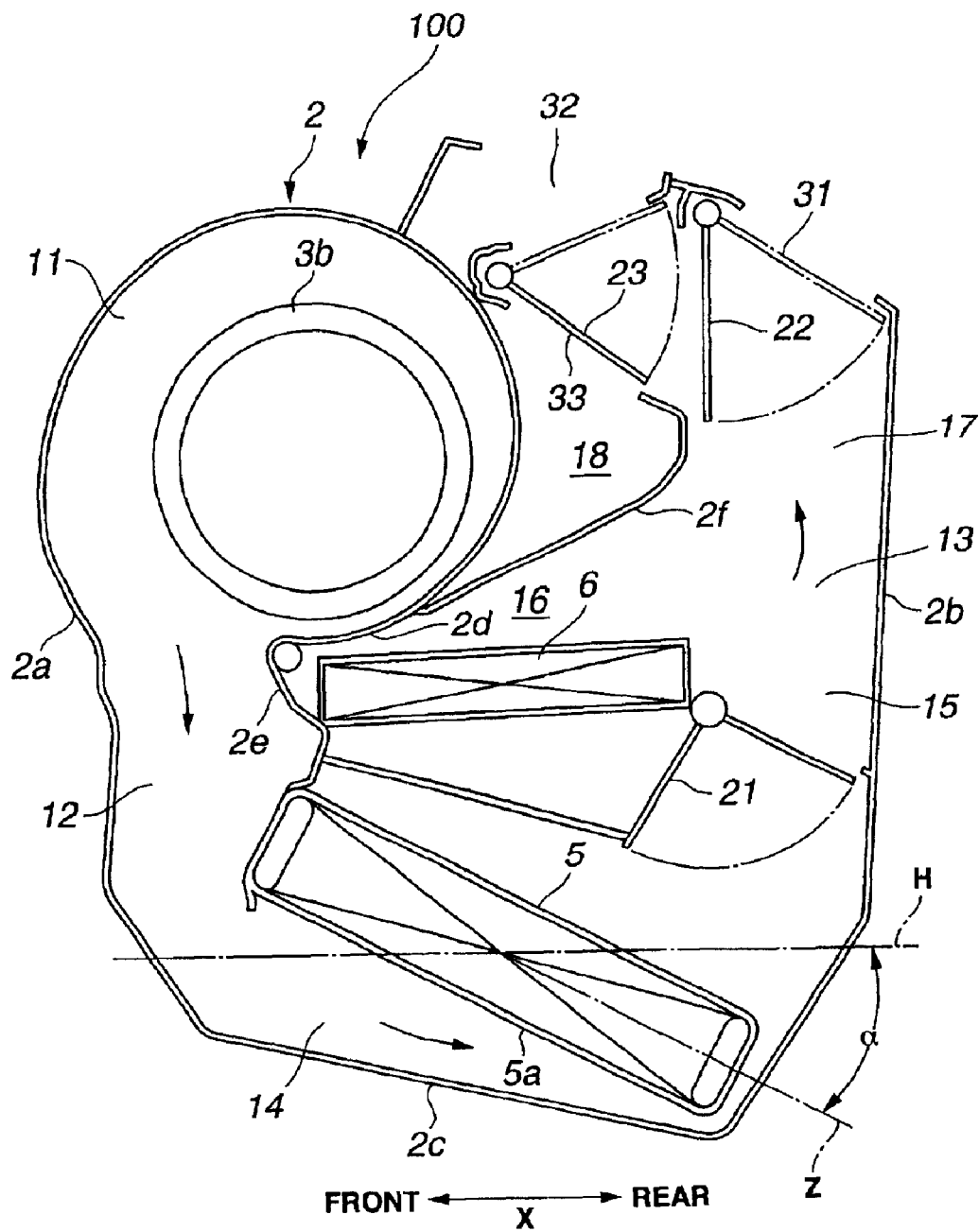
FIG. 3 is a schematic section of the system of a second embodiment.

Referring to FIG. 3, the HVAC system 100 of a second embodiment, according to the invention will be explained hereinafter, which is similar to the first embodiment except the arrangement of the cooling heat-exchanger 5. Like reference numerals denote like parts and therefore detailed explanations therefor are omitted.

As illustrated in FIG. 3, the cooling heat-exchanger 5 is located on the ascending air passage 13 side of the communication air passage 14 and below the heating heat-exchanger 6. The cooling heat-exchanger 5 is inclined in such a manner that the rear end of the cooling heat-exchanger 5 is positioned at a level or height lower than the front end thereof. The inclination angle $\alpha$ of the cooling heat-exchanger 5 relative to the horizontal plane H is approximately 10–30 degrees. The rear end of the cooling heat-exchanger 5 is disposed close to the bottom wall 2c of the casing 2. A distance between the bottom wall 2c and an air flow-in surface 5a on which the cooling heat-exchanger 5 receives the air, becomes gradually short from the front wall 2a side toward the rear wall 2b side. This can permit the air flowing along the bottom wall 2c to be delivered to the air flow-in surface 5a of the cooling heat-exchanger 5 and then pass through the cooling heat-exchanger 5. Therefore, the cooling efficiency of the cooling heat-exchanger 5 can be improved.

Figure 4:
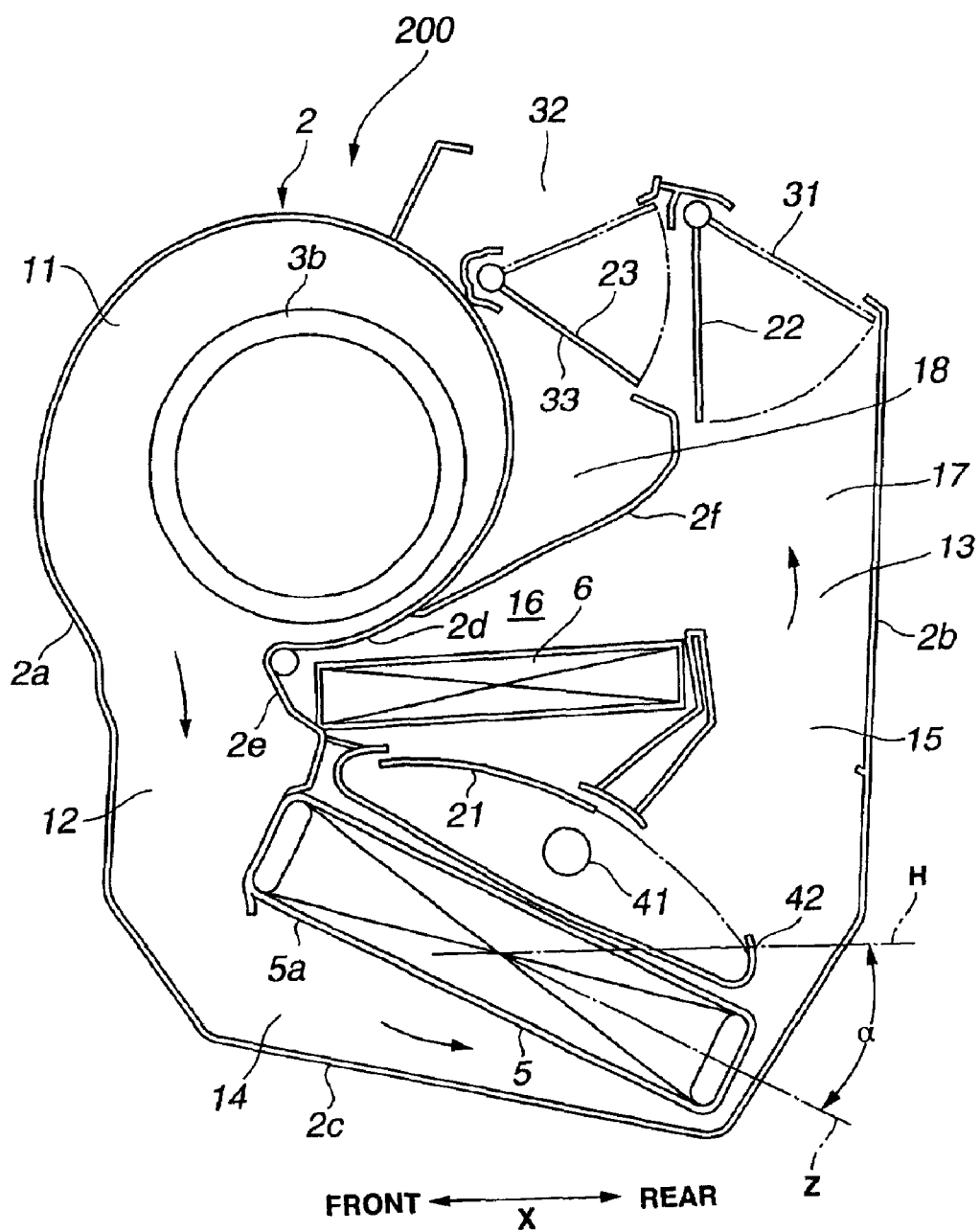
FIG. 4 is a schematic section of the system of a third embodiment.

Referring to FIG. 4, the HVAC system 200 of a third embodiment, according to the invention will be explained hereinafter. The HVAC system 200 differs from the HVAC system 100 of the second embodiment in the structure of the air-mix door 21.

As illustrated in FIG. 4, the air-mix door 21 of a slide type is used in this embodiment. The air-mix door 21 has a rack, not shown, meshed with a pinion gear 41. The air-mix door 21 is slidably moved by the meshed engagement of the rack and the pinion gear 41, between a cool air position and a warm air position. When the air-mix door 21 is placed at the cool air position as shown in FIG. 4, the fluid communication between the cooling heat-exchanger 5 and the bypass air passage 15 is established but the fluid communication between the cooling heat-exchanger 5 and the heating heat-exchanger 6 is blocked. When the air-mix door 21 is placed at the warm air position, the fluid communication between the cooling heat-exchanger 5 and the heating heat-exchanger 6 is established but the fluid communication between the cooling heat-exchanger 5 and the bypass air passage 15 is blocked. The slide-type air-mix door 21 and the pinion gear 41 are mounted to a housing 42. The housing 42 is formed with an opening, not shown, through which the cool air passing through the cooling heat-exchanger 5 flows into the housing 42. Similar to the second embodiment, the third embodiment has the arrangement in which the distance between the bottom wall 2c of the casing 2 and the air flow-in surface 5a of the cooling heat-exchanger 5 gradually becomes shorter from the front wall 2a side toward the rear wall 2b side. This can increase the high cooling efficiency as explained above in the second embodiment.

FIG. 5 illustrates the cooling heat-exchanger 5 used in the second and third embodiments shown in FIGS. 3 and 4, respectively. The cooling heat-exchanger 5 in the second and third embodiments is inclined in the direction X such that the height of the rear end thereof is lower than that of the front end thereof.

Figure 6:
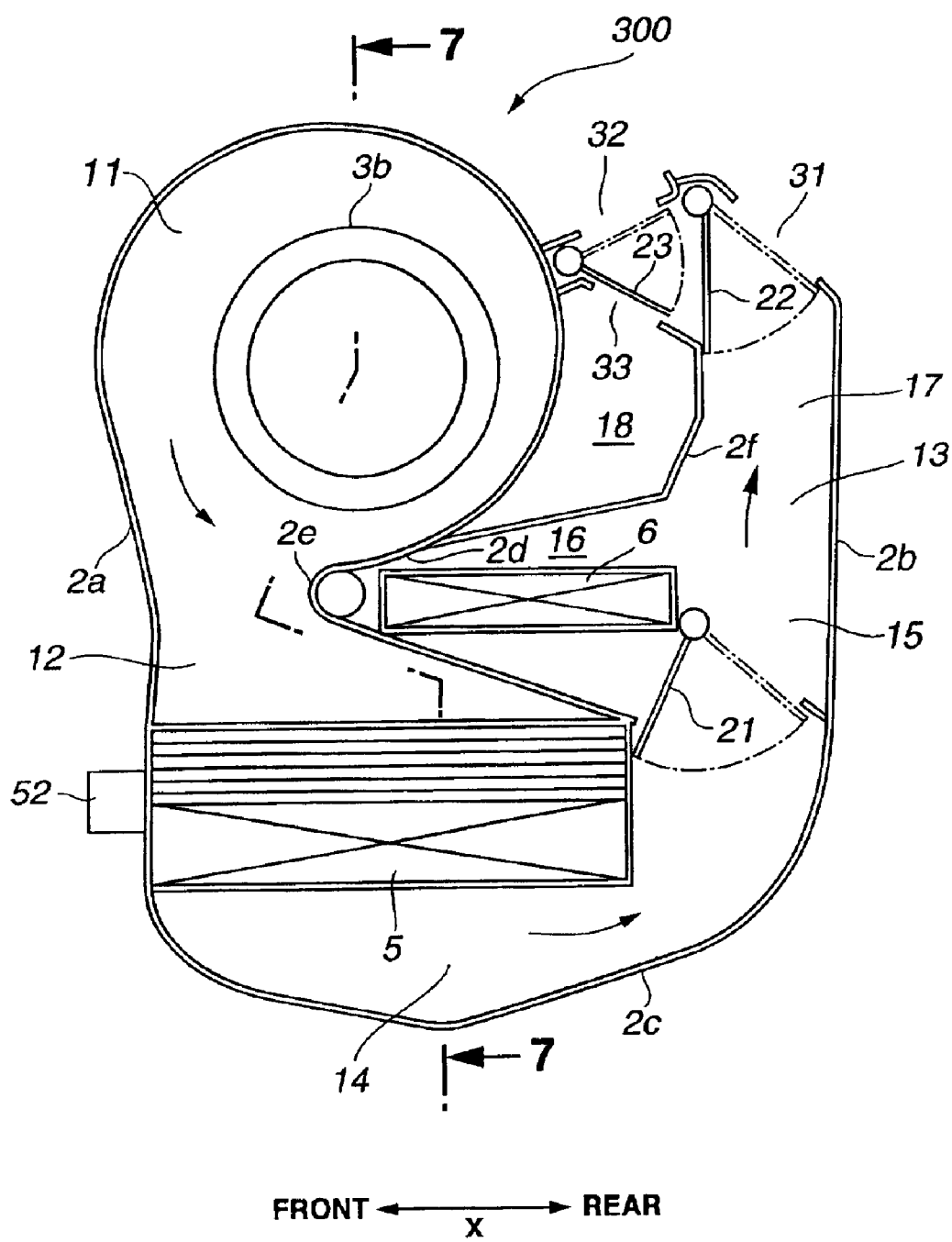
FIG. 6 is a schematic section of the system of a fourth embodiment.
Figure 7:
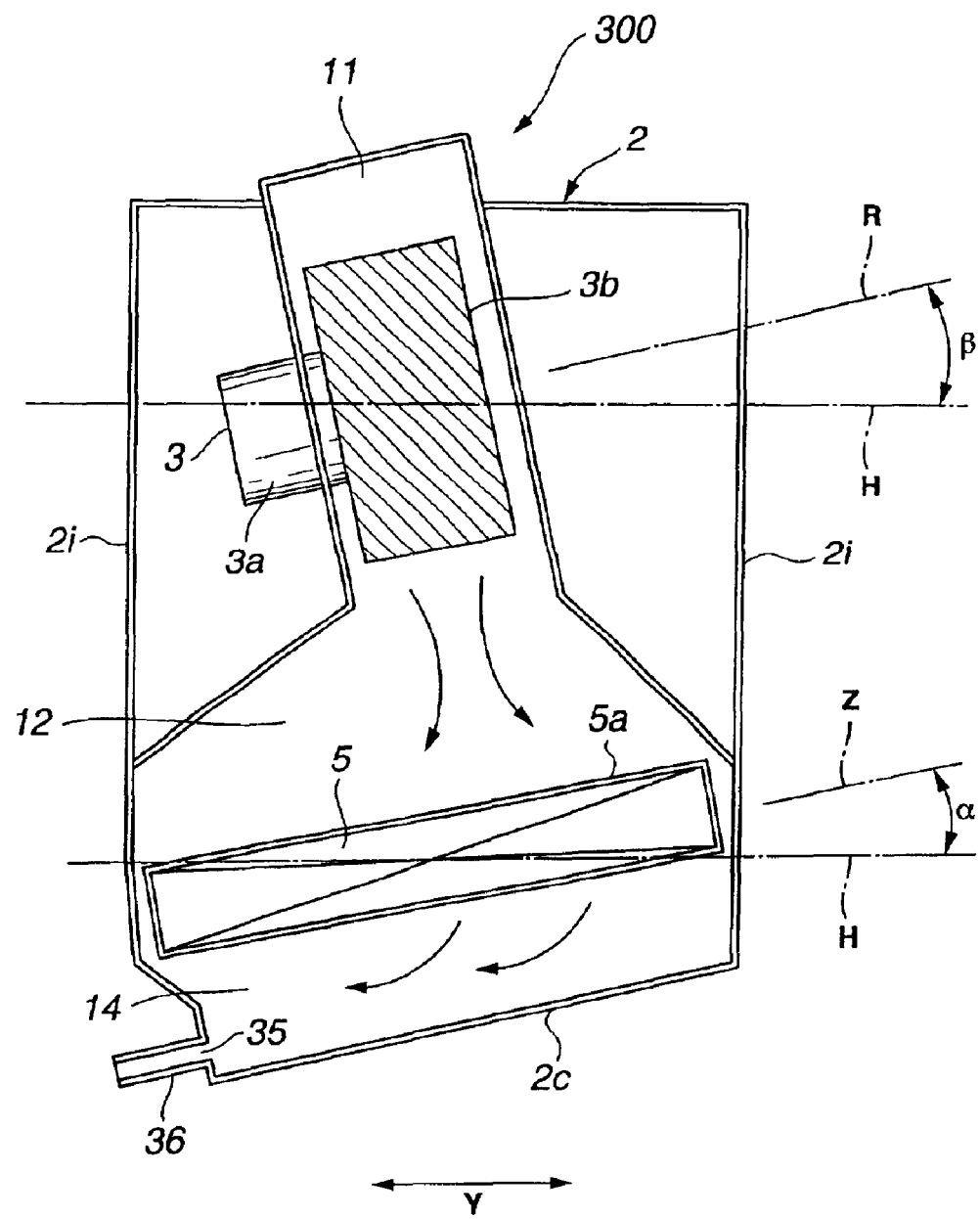
FIG. 7 is a section of the system, taken along the line 7—7 shown in FIG. 6.
Figure 8:
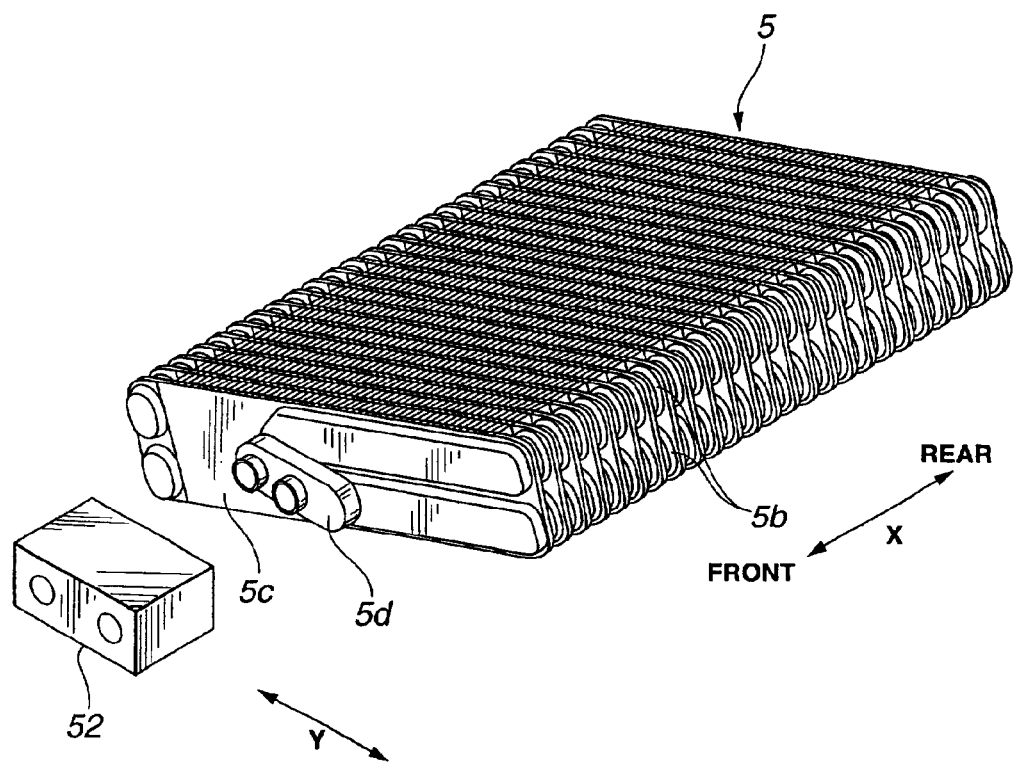
FIG. 8 is a perspective view of a heat exchanger for cooling, shown in FIG. 6.

Referring to FIGS. 6–8, the HVAC system 300 of a fourth embodiment, according to the invention, will be described hereinafter, which is similar to the first to third embodiments except the arrangement of the cooling heat-exchanger 5 and the blower unit 3. Like reference numerals denote like parts and therefore detailed descriptions therefor are omitted.

As seen from FIGS. 6–8, the cooling heat-exchanger 5 of the HVAC system 300 is inclined in the width direction Y of the automobile such that the header pipes 5b of the cooling heat-exchanger 5 extend in the fore and aft direction X of the automobile. The header pipes 5b extend in the direction X in a parallel relation to the refrigerant piping, not shown. The expansion valve 52 is connected with the header pipes 5b through a connecting portion 5d provided on a front end surface 5c of the cooling heat-exchanger 5 which is disposed on the engine room side. The expansion valve 52 is thus directly connected with the cooling heat-exchanger 5 without using the connecting block 51 shown in FIG. 5. This can serve for reducing the number of components and for facilitating the assembly work of connecting the expansion valve 52 with the cooling heat-exchanger 5, and therefore for saving the production cost.

As illustrated in FIG. 7, the cooling heat-exchanger 5 is arranged in an inclined state in the direction Y within the casing 2 such that one, left, side of the cooling heat-exchanger 5 is located at a height or level lower than an opposite, right, side thereof. The predetermined angle α of inclination of the cooling heat-exchanger 5 relative to the horizontal plane H is preferably within a range of approximately 15–30 degrees. Also, the blower unit 3 is mounted to the casing 2 in substantially the same inclined state as that of the cooling heat-exchanger 5 in the direction Y. A rotation axis R of the blower unit 3 is inclined by a predetermined angle β relative to the horizontal plane H which is substantially equal to the predetermined angle α of the cooling heat-exchanger 5. Thus, the inclination direction of the blower unit 3 is substantially the same as that of the cooling heat-exchanger 5. With this arrangement, the air from the multiblade fan 3b of the blower unit 3 is allowed to flow toward the air flow-in surface 5a of the cooling heat-exchanger 5 in a direction substantially perpendicular thereto. This can reduce the ventilation resistance occurring when the air passes through the cooling heat-exchanger 5, as compared with the first to third embodiments. Therefore, an amount of air delivered to the automobile compartment can be increased without enlarging the blower motor 3a of the blower unit 3 and noise generation can be suppressed. The arrangement in this embodiment can also contribute to reduction of a size of the blower motor 3a.

Further, as illustrated in FIG. 7, the blower unit 3 is arranged in an offset relation to the cooling heat-exchanger 5 in the direction Y in such a manner that the air from the multiblade fan 3b is mainly directed toward the right side portion of the cooling heat-exchanger 5 which is located upper than the left side portion thereof. Furthermore, the bottom wall 2c of the casing 2 is inclined downwardly toward the water-collecting central portion in the direction X as shown in FIG. 6, and inclined downwardly along the cooling heat-exchanger 5 in the direction Y and extends from the right side wall 2i to the left side wall 2i as shown in FIG. 7. A drain 35 is formed in a lower-middle portion of the left side wall 2i, through which the condensed water generated at the cooling heat-exchanger 5 is discharged into a drain pipe 36. With the arrangement, the air passing through the upper-leveled right side portion of the cooling heat-exchanger 5 is cooled and dehumidified so that the condensed water generated at the cooling heat-exchanger 5 is forced by the air to be dropped on the bottom wall 2c or permitted to flow along the lower surface of the cooling heat-exchanger 5 and drip on the bottom wall 2c. The water dropped from the cooling heat-exchanger 5 flows downwardly along the bottom wall 2c and enter into the drain 35 of the side wall 2i and then discharged from the casing 2 through the drain pipe 36. This can enhance the water drain property of the HVAC system 300.

In addition, the air-mix door 21 of the slide type can be used in the first, second and fourth embodiments as well as the third embodiment.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A heating, ventilation and air conditioning system for use in an automobile, comprising:

a casing having a vent outlet and a rear wall located rearward in a fore and aft direction of the automobile;

a blower chamber accommodating a blower fan discharging air, said blower chamber being disposed within the casing;

a descending air passage communicated with the blower chamber to permit the air from the blower fan to flow downwardly therethrough;

an inner wall cooperating with the casing to form the blower chamber and the descending air passage, said inner wall being formed with a recessed portion located near a boundary between the blower chamber and descending air passage;

a cooling heat-exchanger adapted to cool the air passing therethrough to produce cool air;

an ascending air passage communicated with the descending air passage and the vent outlet to permit the air passing through the descending air passage to flow upwardly therethrough into the vent outlet;

a heating heat-exchanger disposed within the ascending air passage and adapted to heat the air passing therethrough to produce warm air, said cooling heat-exchanger being disposed between the blower chamber and the heating heat-exchanger;

a bypass air passage juxtaposed to the heating heat-exchanger and communicated with the ascending air passage to permit the cool air from the cooling heat-exchanger to bypass the heating heat-exchanger and flow into the ascending air passage;

an air-mix door adapted to control a proportion of the warm air passing through the heating heat-exchanger and the cool air passing through the bypass air passage;

a foot vent passage communicated with the ascending air passage, the foot vent passage being arranged above the heating heat-exchanger and between the blower chamber and the ascending air passage; and a partition wall cooperating with the rear wall of the casing to define the ascending air passage, the partition wall separating the foot vent passage and the ascending air passage from each other, wherein the heating heat-exchanger is arranged substantially horizontally at the recessed portion of the inner wall and has one end portion adjacent to the recessed portion and an opposite end portion adjacent to the bypass air passage, wherein the bypass air passage and the vent outlet are substantially linearly aligned with each other via the ascending air passage.

2. The system as claimed in claim 2, further comprising a warm air passage disposed downstream of the heating heat-exchanger and communicated with the ascending air passage, said warm air passage guiding the air passing through the heating heat-exchanger toward the bypass air passage side of the ascending air-passage.

3. The system as claimed in claim 2, wherein the warm air passage is formed by the inner wall and the partition wall.

4. The system as claimed in claim 1, further comprising a vent door disposed within the vent outlet, said vent door being moveable to open and close the vent outlet.

5. The system as claimed in claim 1, wherein the cooling heat-exchanger is inclined by a predetermined angle relative to a horizontal plane.

6. The system as claimed in claim 1, wherein the cooling heat-exchanger is inclined in a fore and aft direction of the automobile.

7. The system as claimed in claim 1, wherein the cooling heat-exchanger is inclined in a width direction of the automobile perpendicular to a fore and aft direction thereof.

8. The system as claimed in claim 7, wherein the blower fan is arranged in substantially the same incline as that of the cooling heat-exchanger.

9. The system as claimed in claim 1, wherein the partition wall comprises an uppermost portion formed with a foot communication opening through which the foot vent passage is communicated with the ascending air passage.

10. The system as claimed in claim 9, further comprising a mode door disposed within the foot communication opening, said mode door being moveable to open and close the foot communication opening.

11. The system as claimed in claim 1, wherein the blower fan comprises a rotation axis extending in a lateral direction extending perpendicular to the fore and aft direction of the automobile.

12. A heating, ventilation and air conditioning system for use in an automobile, comprising:

a casing having a vent outlet, the casing having a rear wall positioned rearward in a fore and aft direction of the vehicle;

a blower chamber accommodating a blower fan discharging air, said blower chamber being disposed within the casing;

a first air passage substantially vertically extending within the casing and communicated with the blower chamber to permit the air from the blower fan to flow downwardly therethrough;

a second air passage substantially vertically extending within the casing and communicated with the first air passage to permit the air passing through the first air passage to flow upwardly therethrough into the vent outlet;

a cooling heat-exchanger adapted to cool the air passing therethrough to produce cool air;

a heating heat-exchanger arranged substantially horizontally within the second air passage and in an at least partially overlapping relation to the cooling heat-exchanger in a vertical direction, said heating heat-exchanger being adapted to heat the air passing therethrough to produce warm air, said cooling heat-exchanger being disposed between the blower chamber and the heating heat-exchanger;

wall cooperating with the casing to define the blower chamber, the first air passage, the second air passage and a recessed portion located near a boundary between the blower chamber and the first air passage and adjacent to the heating heat-exchanger;

a bypass air passage arranged in substantially linear alignment with the vent outlet via the second air passage in the vertical direction, said bypass air passage being juxtaposed to the heating heat-exchanger in a fore and aft direction of the automobile and communicated with the second air passage to permit the cool air from the cooling heat-exchanger to bypass the heating heat-exchanger and flow into the second air passage; and a foot vent passage arranged above the heating heat-exchanger and between the blower chamber and the second air passage, said foot vent passage being communicated with the second air passage, wherein the wall comprises a partition wall that cooperates with the rear wall of the casing, to define the second air passage, the partition wall separating the foot vent passage from the second air passage.

13. The system as claimed in claim 12, wherein the wall comprises an inner wall bent near the boundary between the blower chamber and the first air passage to form the recessed portion, said recessed portion being disposed adjacent to one end portion of the heating heat-exchanger, an opposite end portion of which is disposed adjacent to the bypass air passage.

14. The system as claimed in claim 12, wherein the cooling heat-exchanger is inclined by a predetermined angle relative to a horizontal plane.

15. The system as claimed in claim 14, wherein the cooling heat-exchanger is inclined by a predetermined angle relative to a horizontal plane in the fore and aft direction of the automobile.

16. The system as claimed in claim 14, wherein the cooling heat-exchanger is inclined in a width direction of the automobile perpendicular to the fore and aft direction thereof.

17. The system as claimed in claim 12, wherein said partition wall comprises an uppermost portion formed with a foot communication opening communicating the foot vent passage with the second air passage.

* * * * *